United States Patent [19]

Alden et al.

[11] Patent Number: 4,872,352

[45] Date of Patent: Oct. 10, 1989

[54] FLOW METER PULSE TRANSMITTER

[75] Inventors: Kevin Alden, 23983 Enriquez Dr., Diamond Bar, Calif. 91765; Charles Alden, Escondito, Calif.

[73] Assignee: Kevin Alden, Diamond Bar, Calif.

[21] Appl. No.: 862,311

[22] Filed: May 12, 1986

[51] Int. Cl.⁴ .................. G01F 1/075; G01F 1/115
[52] U.S. Cl. .............................. 73/861.77; 73/866.1
[58] Field of Search .......... 73/861.77, 861.78, 861.79, 73/861.87, 861.88, 861.93, 861.94, 258, DIG. 5, 866.1; 116/267; 324/168

[56] References Cited

U.S. PATENT DOCUMENTS

| | | | |
|---|---|---|---|
| 979,518 | 12/1910 | Larrabee | 73/861.79 |
| 2,371,511 | 3/1945 | Faus | 73/DIG. 5 |
| 2,529,481 | 11/1950 | Brewer | 73/861.94 |
| 2,757,364 | 7/1956 | Hood | 116/267 X |
| 2,960,074 | 11/1960 | Zavada | 73/258 X |
| 3,093,973 | 6/1963 | Williams | 73/861.79 X |
| 3,163,041 | 12/1964 | Karlby et al. | 73/861.94 |
| 4,140,013 | 2/1979 | Hunger et al. | 73/861.77 |
| 4,548,084 | 10/1985 | Onoda et al. | 72/861.87 X |

OTHER PUBLICATIONS

An-8-Concrete Additive Meters, Badger Meter, Inc., Milwaukee, Wis., 6-80, 3 pp.
Manual-Pulse Transmitter Models MS-E5 and MS-ER5, Badger Meter, Inc., Mil., Wis., 1/85, 3 pp.
"Trident 8", Data Sheet J621, Neptune Water Meter Co, Tallassee, Al, 3/84.

Primary Examiner—Herbert Goldstein
Attorney, Agent, or Firm—Sheldon & Mak

[57] ABSTRACT

A pulse transmitter for a liquid flow meter comprises an input shaft rotatably mounted in a housing and magnetically coupled through a wall of the housing to a rotor of the meter. A meanetic reed switch for electrical current interrupt is operated by a rotating magnetic member on an output shaft, the output shaft being connected to the input shaft by a pair of calibration gears. The input shaft has a pinion thereon, the transmitter including provisions for compound reduction gearing to a sleeve on the input shaft, the sleeve driving one of the calibration gears. The input shaft also has an upper magnetic coupling member for driving a visible indicator ball through a wall of the housing, the ball being confined in an external cavity by a transparent member.

19 Claims, 1 Drawing Sheet

FLOW METER PULSE TRANSMITTER

BACKGROUND

The present invention relates to fluid flow meters, and more particularly to a pulse transmitter for a positive element or rotating-element flow meter.

A conventional class of flow meters has a rotatable component such as a spindle connected to a nutating disk. Traditionally, such meters are equipped with mechanical counters or totalizers for indicating a cumulative volume which is periodically read and recorded. In industrial process applications such as mixing batches of concrete, it is desired to continuously monitor and control the flow in order to maintain a correct mixture. Thus the meter is equipped with a transmitting device that is monitored by a computer, pulse counter or the like in an electronic control system. Rotation of the element, coupled magnetically through a wall of the meter, is transferred to an input shaft of a pulse transmitter that is fastened to the meter. The pulse transmitter is typically equipped with reduction gears for providing a calibration range and interchangeable calibration gears for making small-scale changes in the quantity of fluid metered per pulse.

The conventional pulse transmitters have one or more of the following disadvantages:

1. They are unreliable because of the excessive drag caused by a large number or range and calibration gearing elements, particularly where unity reduction or step-up gearing is required;
2. They are unreliable because of magnetic interference between the magnetic coupling and a magnetically operated switch used as the transmitting device;
3. They are expensive to produce in that a large number of transmitters having separate calibration ranges must be inventoried because the calibration gears provide a limited calibration range for each transmitter;
4. They are difficult to monitor in operation because the moving parts are not visible; and
5. Field modification of the range of calibration is impractical because difficult dissassembly and reassembly of the transmitter is required.

Thus there is a need for a pulsed flow transducer that has low rotational drag at unity reduction ratio, a large range of field-changeable calibration, and is reliable, easy to monitor, and inexpensive to produce.

SUMMARY

The pulse transducer of the present invention meets this need by incorporating a unique convertible combination of direct drive, reduction gearing and calibration gearing to a pulse device. The transducer includes a rotationally mounted input shaft having input coupling means, an output shaft coupled to current interrupt means, calibration gear means for connecting the output shaft to sleeve means on the input shaft, and range means for driving the sleeve means from the input shaft at a predetermined turns ratio.

Preferably the transducer includes means for mounting a compound shaft in geared relation to the input shaft without disturbing the mounting of the input shaft, the calibration gear means being capable of being driven by the compound shaft.

An important feature of the present invention is that the compound shaft, being installable without disturbing the mounting of the input shaft, facilitates field modification of the transmitter to different ranges of calibration.

Another feature of the present invention is that a range turns ratio of one-to-one is achieved by direct drive of the calibration gears from the input shaft. Thus the complexity and added drag of the compound shaft may be avoided when the one-to-one range ratio is implemented.

Preferably the transducer includes a housing, indicating means movable in a cavity of the housing and retained by window means, and a magnetic member on the input shaft for coupling rotation of the input shaft to the indicating means.

In a preferred version, the transmitter includes a housing, an input shaft in the housing having a pinion and a first magnetic member coupling the input shaft to an external rotating member, support means for a compound shaft geared to the pinion, current interrupt means responsive to rotation of an output shaft, and calibration gear means for coupling the output shaft to the input shaft. A drive gear of the calibration gear means may be fixed to the input shaft for providing a range turns ratio of unity. Alternatively, the calibration gear means is geared to the compound shaft.

Preferably the current interrupt means includes a magnetically operated switch coupled to an output magnetic member on the output shaft. Preferably the input and output magnetic members have axially concentrated magnetic fields facing apart, the output magnetic member being located between the switch and the input magnetic member for preventing magnetic interference between the magnetic members and the switch.

The present invention provides a method for generating electrical pulses corresponding to rotation of a rotating member, the method including the steps of:

(a) rotatably mounting an input shaft in axial alignment with the rotating member;
(b) coupling the input shaft to the rotating member for rotating the input shaft in unison with the rotating member;
(c) mounting a pinion gear on the input shaft;
(d) providing a sleeve on the input shaft, the sleeve rotating in response to rotation of the input shaft;
(e) gearing an output shaft to the sleeve;
(f) providing means for mounting a compound shaft geared to the pinion and to the sleeve; and
(g) interrupting an electrical current by operating switch means from the output shaft.

Preferably the method includes the further steps of:

(a) providing a compound shaft, the compound shaft having a driven gear fixed thereto;
(b) inserting, without disturbing the mounting of the input shaft, the compound shaft into the mounting means with the driven gear in mesh with the pinion;
(c) affixing a first change gear to the compound shaft;
(d) engaging a second change gear with the sleeve, the second change gear being in mesh with the first change gear.

DRAWINGS

These and other features, aspects, and advantages of the present invention will become better understood with reference to the following description, appended claims, and accompanying drawings where:

DESCRIPTION

Figure 1:
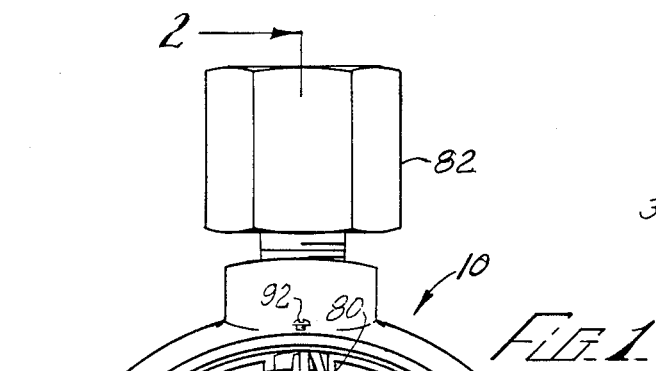
FIG. 1 is a fragmentary plan view of a pulse transmitter according to the present invention.
Figure 3:
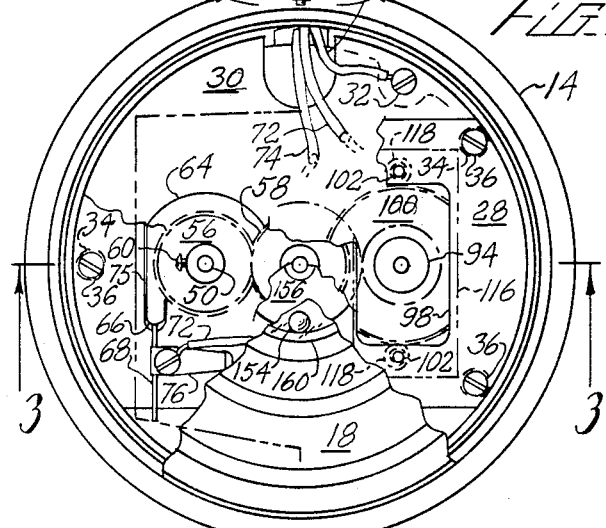
FIG. 3 is a fragmentary sectional elevational view of the transmitter of FIG. 1 taken on line 3—3 in FIG. 1.
Figure 3:
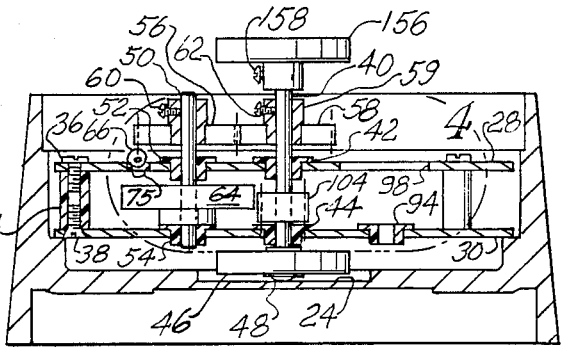
Figure 2:
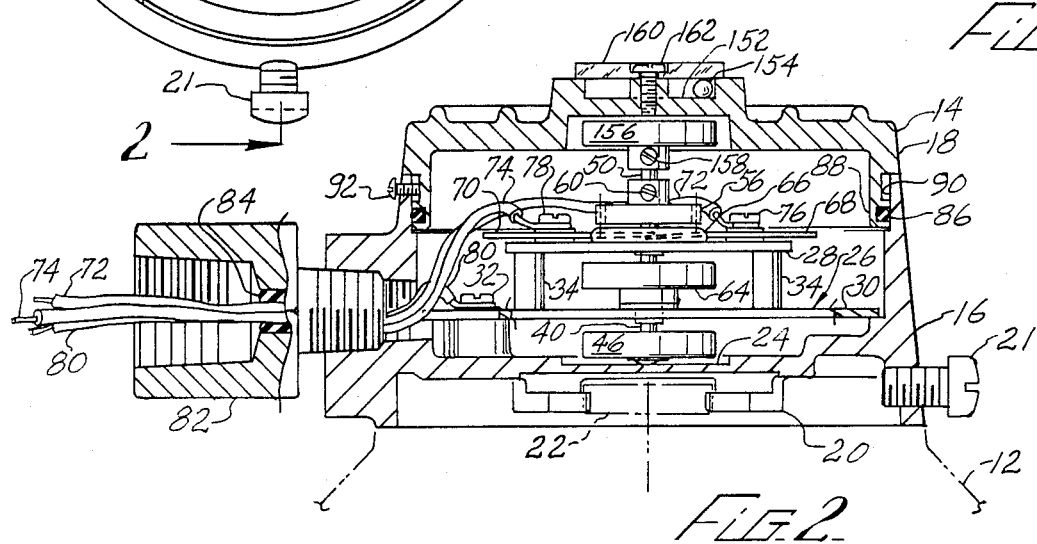
FIG. 2 is a fragmentary sectional elevational view of the transmitter of FIG. 1 taken on line 2—2 in FIG. 1.

The present invention is directed to a pulse transmitter for a rotational or positive displacement fluid flow meter. With reference to FIGS. 1–3, a transmitter unit 10 according to the present invention is attached to a meter 12, the transmitter unit 10 having a housing 14. The housing 14 has a body 16 and a cover 18, the body 16 having a bayonet mount 20 for engaging the meter assembly 12. A base screw 21 secures the housing 14 to the meter assembly in a selected orientation. The meter assembly 12 includes a magnetic rotor 22 coupled to a measuring element therein (not shown), the rotor 22 being located proximate to a wall portion or coupling partition 24 of the body 16.

A gear plate assembly 26 having an upper plate 28 and a lower plate 30 is mounted inside the housing 14, the lower plate 30 being fastened to the body 16 by at least one mounting screw 32. The upper plate 28 and the lower plate 30 are held in separated parallel alignment by a plurality of standoffs 34. The upper plate 28 and the lower plate 30 are fastened to the standoffs 34 by corresponding plate screws 36 and 38.

A vertically disposed input shaft 40 is rotatably mounted to the plate assembly 26 on a pair of flanged bushings 42 and 44, the input shaft 40 having a magnetic member or input coupling 46 fixed thereon proximate the coupling partition 24 and aligned with the rotor 22 of the meter assembly 12. Thus the input shaft 40 rotates in unison with the rotor 22, the housing 14 (including the coupling partition 24) being of a non-magnetic material for freely permitting passage of a rotating magnetic field. The input coupling 46 has an axially concentrated magnetic field, the flux of which is directed substantially exclusively downwardly toward the rotor 22 for preventing magnetic interference in the transmitter unit 10, as further described herein.

A centrally located thrust member or button 48 is fixed to the bottom of the input coupling 46. The button 48, comprising a low-friction, self-lubricating material such as an acetal resin, rests against the coupling partition 24 for defining a vertical position of the input coupling 46, and for limiting rotational drag on the input shaft 40.

An output shaft 50 is rotatably mounted on a pair of bushings 52 and 54 to one side of the input shaft 40 and is connected thereto by a pair of calibration gears 56 and 58. The gears 56 and 58 are clamped to the output shaft 50 and the input shaft 40 by respective set screws 60 and 62. The output shaft 50 has a magnetic member or output coupling 64 fixed thereon for actuating a magnetic reed switch 66. The output coupling 64 has an axially concentrated magnetic field, the flux of which is directed substantially exclusively upwardly toward the switch 66 for preventing magnetic interference between the input coupling 46 and the output coupling 64. The output coupling 64 is located between the switch 66 and the input coupling 46, the respective fields facing apart. Consequently, magnetic interference with proper operation of the switch 66 is prevented by the downwardly facing flux of the input coupling 46, described above, and the oppositely facing flux of the output coupling 64, effectively shielding the switch 66 from the rotor 22 and the input coupling 46.

The switch 66 has a pair of leads 68 and 70, each clamped with a respective wire 72 and 74 by a corresponding terminal clamp 76 and 78 on the upper plate 28. The upper plate 28 is formed of an electrically non-conductive material such as phenolic for isolating the leads 68 and 70 from the housing 14. The switch 66 is located in a slot 75 in the upper plate 28 for conveniently aligning the switch 66 proximate to the output coupling 64. Rotational orientation of the switch 66 on its axis is not critical; thus the switch 66 may be installed by dropping it in the slot 75, with the leads 68 and 70 engaging the clamps 76 and 78, then tightening the clamps 76 and 78.

The wires 72 and 74 permit the switch 66 to be connected in an electrical circuit (not shown) for producing pulses corresponding to the rotation of the output shaft 50 by interrupting electric current in the circuit in a conventional manner. The wires 72 and 74, together with a ground wire 80 that is connected to the body 16 by the mounting screw 32, are brought out of the housing 14 through a fitting 82, the fitting 82 being threaded into the body 16. Moisture is excluded from the housing 14 by a barrier 84 of potting compound, epoxy or the like, formed around the wires 72, 74 and 80 in the fitting 18. Moisture is further excluded from the housing 14 by an O-ring seal 86 between a flange 88 of the cover 18 and a bore 90 of the body 16, the cover 18 being clamped in position by a cover screw 92.

The cover 18 is provided with an annular cavity 152 on the outside thereof in line with the input shaft 40. A magnetically permeable ball 154 is free to roll within the cavity 152 for indicating movement of the input shaft 40. A magnetic indicator coupling 156 is fastened to the top of the input shaft 40 by a set screw 158 for coupling movement of the input shaft 40 to the ball 154. Thus when rotation of the rotor 22 produces a corresponding rotation of the input shaft 40, the ball 154 moves in unison with the rotor 22. A transparent window 160 is fastened to the cover 18 by a window screw 162, the window retaining the ball 154 in the cavity 152. The indicator coupling 156 has an axially concentrated magnetic field, the flux of which is directed substantially exclusively upwardly away from the switch 66 and toward the ball 154 for preventing magnetic interference between the indicator coupling 156 and the switch 66.

The movement of the ball 154 is useful for verifying that the rotor 22 is moving and that the motion is being coupled into the transmitter unit 10. It has also been determined that observation of the ball 152 in motion greatly facilitates calibration of the meter assembly 12 in its process application. In fact, observation of the ball 154 is more effective in calibration than observation of a traditional totalizer indicator.

The purpose of the calibration gears 56 and 58 is to permit ratio changes between the input shaft and the output shaft for generating electrical pulses at desired metered volume intervals. There is a practical limit, however, in the range of possible ratios. The maximum step-down or step-up ratio is limited firstly by the required minimum gear size compatible with the respective shafts 40 and 50, and corresponding clearance about the other shaft. The maximum step-up ratio is also limited secondly by a maximum resultant drag that is reflected to the rotor 22. A third limitation is that a combination of a very large gear in mesh with a small gear is subject to binding between mating teeth unless unduly expensive manufacturing techniques are utilized. Thus a maximum step-up or step-down ratio of approximately 3:1 is possible or, conservatively, 2:1 with molded gears on metallic hubs that are easily interchangable.

Further gearing is needed, however, for covering typical pulse rate requirements ranging from about eight pulses per revolution of the rotor 22 down to about one pulse per forty revolutions of the rotor 22. The range of required ratios is 80:1, even if the output coupling 64 is appropriately selected to have either four magnetic poles or one, giving rise to a corresponding number of pulses per revolution of the output shaft 50. For example, a step-up ratio of 2:1 between the input shaft 40 and the output shaft 50 produces eight pulses per revolution of the rotor 22 when the output coupling 64 has four magnetic poles. Also, a step down ratio of 2:1 between the input shaft 40 and the output shaft 50 produces one pulse in forty revolutions of the input shaft 40, using a single magnetic pole output coupling 64, only if an additional 20:1 reduction is applied between the input shaft 40 and the gear 58. For simplicity, the following discussion is limited to the presence of four magnetic poles in the output coupling 64.

The reflected drag is not excessive at a 2:1 step-up as long as the gear 58 is directly connected to the input coupling 46; however, difficulty with excessive drag may be encountered at a step-up ratio greater than approximately 1.6:1 when additional gearing is introduced between the input coupling 46 and the gear 58.

The present invention permits direct connection of the gear 58 to the input shaft 40 as described above, as well as connection through a compound reduction as described herein. Field modifications between these configurations are possible without requiring complicated disassembly or removal of the gear plate assembly 26 from the housing 14 or disturbing the rotational mounting or alignment of either the input shaft 40 or the output shaft 50.

As shown in FIGS. 1 and 3, the lower plate 30 incorporates a flanged bushing 94 for receiving a compound shaft 96, described below. The upper plate 28 is formed with an opening 98 for passing a driven gear 100, described below, a pair of threaded mounting holes 102 being formed in the upper plate 28 on opposite sides of the opening 98. Additionally, the input shaft has a pinion 104 fixed thereto between the plates 28 and 30 for driving the driven gear 100.

Figure 5:
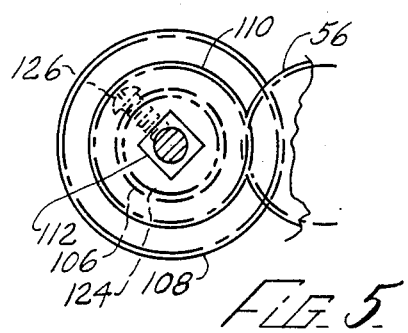
FIG. 5 is a fragmentary plan sectional detail view taken on line 5—5 in FIG. 4.
Figure 4:
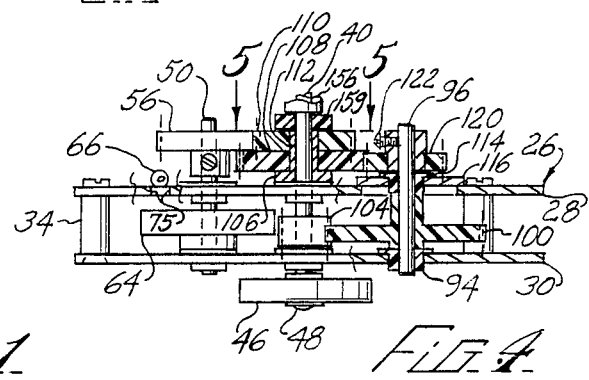
FIG. 4 is a fragmentary sectional elevational view of an alternative configuration of the transmitter of FIG. 1 within region 4 in FIG. 3.

With further reference to FIGS. 4 and 5, when it is desired to incorporate a gear reduction between the input shaft 40 and the gear 58, the gear 58 is replaced by a sleeve 106, a driven gear 108, and a calibration gear 110, the gear 110 functioning in place of the gear 58. The gear 56 is inverted as shown for properly engaging the gear 110. The sleeve 106 turns freely on the input shaft 40, but the gears 108 and 110 are rotationally locked together by engaging a non-circular portion of the sleeve 106. As shown in FIG. 5, a shank portion 112 of the sleeve 106 is of square cross-section for rotationally locking thereto the gears 108 and 110. The shank portion 112 is concentric with the input shaft 40 for maintaining alignment of the gears 108 and 110. As shown in FIG. 4, a spacer 159 is located on the input shaft 40 between the indicator coupling and the gear 110 for retaining the gear 110 on the spacer 106.

The input shaft 40 is rotationally coupled to the gear 110 by means of the driven gear 100, fixed to the compound shaft 96 as shown in FIG. 4, the compound shaft 96 being rotationally mounted on the bushing 94 and an additional bushing 114 in an auxiliary plate 116, the plate 116 being fastened to the upper plate 28 by a pair of screws 118. A drive gear 120, fastened to the compound shaft 96 by a set screw 122, engages the driven gear 108 that is locked to the gear 110 as described above. The compound shaft 96, together with the driven gear 100, is lowered through the opening 98 by tipping the shaft 96 outwardly away from the input shaft 40 until the gear 100 passes through the opening 98. Thus the opening 98 need not be fully as large in diameter as the gear 100 for permitting assembly of the shaft 96 with the gear 100 without separating the upper plate 28 or the lower plate 30 from the standoffs 34.

As shown in FIG. 5, the gear 110 and the sleeve 106 may be fixed directly on the input shaft 40 by substituting a collar 124 for the gear 108, a set screw 126 engaging the collar 124 and extending through the sleeve 106 against the input shaft 40.

Figure 6:
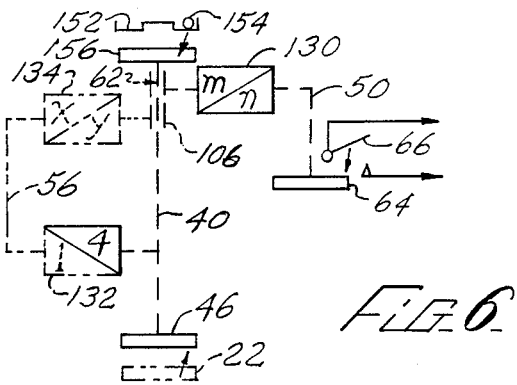
FIG. 6 is a schematic diagram of the transmitter of FIG. 1.

With further reference to FIG. 6, block 130 represents the calibration gear ratio between the input shaft 40 (or sleeve 106) and the output shaft 50 produced by the gears 56 and 58 (110). When the gear 58 is used, a hub 59 thereof functions as a sleeve directly coupled to the input shaft by the set screw 62. In the block 130, m represents the number of revolutions of the input shaft 40 (sleeve 106) during a corresponding number n of revolutions of the output shaft 50. Thus m/n is a reduction or step-down ratio between the input shaft 40 (sleeve 106) and the output shaft 50.

Similarly, block 132 represents a reduction ratio between the input shaft 40 and the compound shaft 96, if present. The numeral 4 and the phantom numeral 1 indicate a reduction or step-down ratio of 4:1, such as produced by the pinion 104 having 11 teeth and the gear 100 having 44 teeth. Block 134 represents a gear ratio between the compound shaft 96 and the sleeve 106, the phantom letters x and y representing the number of corresponding revolutions of the respective compound shaft 96 and sleeve 106. Thus x/y is the step-down ratio between the shaft 96 and the sleeve 106. It should be understood that when either m/n or x/y are less than unity, a step-up ratio that is the inverse of the respective fraction is indicated.

In the following tables are given a number of possible gear combinations in a preferred implementation of the present invention. In the tables, "Vol." represents the number of revolutions of the input shaft 40 (and the rotor 22) that is required to produce one opening and closing of the switch 66.

TABLE 1

| Vol. | m | n | m/n | x | y | x/y | 4x/y |
|---|---|---|---|---|---|---|---|
| 0.1136 | 20 | 44 | 0.455 | — | — | — | — |
| 0.125 | 19 | 38 | 0.500 | — | — | — | — |
| 0.226 | 19 | 21 | 0.905 | — | — | — | — |
| 0.250 | 28 | 28 | 1.000 | — | — | — | — |
| 0.452 | 38 | 21 | 1.810 | — | — | — | — |
| 0.500 | 38 | 19 | 2.000 | — | — | — | — |
| 0.500 | 28 | 28 | 1.000 | 19 | 38 | 0.500 | 2.000 |
| 0.678 | 19 | 21 | 0.905 | 24 | 32 | 0.750 | 3.000 |
| 0.750 | 28 | 28 | 1.000 | 24 | 32 | 0.750 | 3.000 |
| 0.905 | 19 | 21 | 0.905 | 27 | 27 | 1.000 | 4.000 |
| 1.000 | 28 | 28 | 1.000 | 27 | 27 | 1.000 | 4.000 |
| 1.131 | 19 | 21 | 0.905 | 30 | 24 | 1.250 | 5.000 |

TABLE 1-continued

| Vol. | m | n | m/n | x | y | x/y | 4x/y |
|---|---|---|---|---|---|---|---|
| 1.200 | 28 | 28 | 1.000 | 30 | 24 | 1.250 | 5.000 |
| 1.357 | 19 | 21 | 0.905 | 30 | 20 | 1.500 | 6.000 |
| 1.500 | 28 | 28 | 1.000 | 30 | 20 | 1.500 | 6.000 |
| 1.809 | 19 | 21 | 0.905 | 38 | 19 | 2.000 | 8.000 |
| 2.000 | 28 | 28 | 1.000 | 38 | 19 | 2.000 | 8.000 |
| 2.262 | 38 | 21 | 1.810 | 30 | 24 | 1.250 | 5.000 |
| 2.500 | 38 | 19 | 2.000 | 30 | 24 | 1.250 | 5.000 |
| 2.714 | 38 | 21 | 1.810 | 30 | 20 | 1.500 | 6.000 |
| 3.000 | 38 | 19 | 2.000 | 30 | 20 | 1.500 | 6.000 |
| 3.619 | 19 | 21 | 0.905 | 44 | 11 | 4.000 | 16.00 |
| 4.000 | 28 | 28 | 1.000 | 44 | 11 | 4.000 | 16.00 |
| 7.238 | 38 | 21 | 1.810 | 44 | 11 | 4.000 | 16.00 |
| 8.000 | 38 | 19 | 2.000 | 44 | 11 | 4.000 | 16.00 |

TABLE 2

| Vol. | m | n | m/n | x | y | Nom V. | Change |
|---|---|---|---|---|---|---|---|
| 0.1111 | 20 | 45 | 0.444 | — | — | 0.1136 | −2.22% |
| 0.1163 | 20 | 43 | 0.465 | — | — | 0.1136 | +2.32% |
| 0.1218 | 19 | 39 | 0.487 | — | — | 0.125 | −2.56% |
| 0.1284 | 19 | 37 | 0.514 | — | — | 0.125 | +2.70% |
| 0.220 | 29 | 33 | 0.879 | — | — | 0.226 | −3.00% |
| 0.233 | 28 | 30 | 0.933 | — | — | 0.226 | +3.15% |
| 0.242 | 32 | 33 | 0.970 | — | — | 0.250 | −3.10% |
| 0.258 | 33 | 32 | 1.031 | — | — | 0.250 | +3.10% |
| 0.440 | 37 | 21 | 1.762 | — | — | 0.452 | −2.70% |
| 0.464 | 39 | 21 | 1.857 | — | — | 0.452 | +2.63% |
| 0.485 | 32 | 33 | 0.970 | 19 | 38 | 0.500 | −3.10% |
| 0.486 | 37 | 19 | 1.947 | — | — | 0.500 | −2.70% |
| 0.513 | 39 | 19 | 2.053 | — | — | 0.500 | +2.56% |
| 0.515 | 33 | 32 | 1.031 | 19 | 38 | 0.500 | +3.10% |
| 0.659 | 29 | 33 | 0.789 | 24 | 32 | 0.678 | −3.00% |
| 0.700 | 28 | 30 | 0.933 | 24 | 32 | 0.678 | +3.15% |
| 0.727 | 32 | 33 | 0.970 | 24 | 32 | 0.750 | −3.10% |
| 0.773 | 33 | 32 | 1.031 | 24 | 32 | 0.750 | +3.10% |
| 0.879 | 29 | 33 | 0.879 | 27 | 27 | 0.905 | −3.00% |
| 0.933 | 28 | 30 | 0.933 | 27 | 27 | 0.905 | +3.00% |
| 0.970 | 32 | 33 | 0.970 | 27 | 27 | 1.000 | −3.10% |
| 1.031 | 33 | 32 | 1.031 | 27 | 27 | 1.000 | +3.10% |
| 1.098 | 29 | 33 | 0.878 | 30 | 24 | 1.131 | −3.00% |
| 1.166 | 28 | 30 | 0.933 | 30 | 24 | 1.131 | +3.00% |
| 2.434 | 37 | 19 | 1.947 | 30 | 24 | 1.250 | −2.70% |
| 2.566 | 39 | 19 | 2.053 | 30 | 24 | 1.250 | +2.56% |

Table 1 lists a number of "nominal" volumes that correspond to useful engineering units when the transmitter unit 10 is used with commercially available meters. Table 2 shows how the calibration gears 56 and 58 (or 110) may be used to raise or lower the nominal volumes on the order of three percent. Thus Nom. V. in Table 2 is a corresponding Vol. from Table 1.

The transmitter unit 10 of the present invention is unencumbered with complicated drag-producing gearing between the input coupling 46 and the calibration gear 58 unless a significant reduction ratio is required, in which case gearing drag is not a serious factor in reliable operation.

Additionally, the transmitter unit 10 is inexpensive to produce in that a large number of transmitters having separate calibration ranges need not be inventoried because an unlimited number of the available gear combinations may easily be incorporated without requiring complicated disassembly of the unit. Moreover, field modification of the range of calibration is quite practical because difficult dissassembly and reassembly of the transmitter is not involved.

In particular, a kit for implementing range gearing from the pinion 104 of the transmitter unit 10 includes the compound shaft 96 having the driven gear 100, the auxiliary plate 116 having the bushing 114, a pair of the screws 118, the collar 106, and at least one each of the gears 108, 110, and 120.

Moreover, the transmitter unit 10 is easy to visually monitor in operation by means of the indicating ball 154 that moves in unison with the rotor 22.

Although the present invention has been described in considerable detail with reference to certain preferred versions thereof, other versions are possible. For example, the auxiliary plate 116 can provide complete rotational support for the compound shaft 96, substituting for the bushing 94. Also, the pinion 104 can be removably clamped to the input shaft 40 above the upper plate 28. Therefore, the spirit and scope of the appended claims should not necessarily be limited to the description of the preferred versions contained herein.

What is claimed is:

1. Apparatus for generating pulses corresponding to the rotation of a rotating member, the apparatus comprising:
    (a) a rotatably mounted input shaft;
    (b) means on the input shaft for coupling the input shaft to the rotating member;
    (c) an output shaft;
    (d) means for repetitively interrupting an electrical current in response to rotation of the output shaft;
    (e) sleeve means on and concentric with the input shaft;
    (f) calibration gear means for rotating the output shaft in response to rotation of the sleeve means; and
    (g) range means for rotating the sleeve means at a predetermined turns ratio relative to the input shaft, comprising:
        (i) auxiliary support means for rotatably mounting a compound shaft and gearing the compound shaft to the input shaft and to the sleeve means;
        (ii) a first range member operatively connected between the input shaft and the sleeve means, whereby the turns ratio is a first turns ratio; and
        (iii) means for disconnecting the first range member and receiving and connecting a second range member between the input shaft and the sleeve means at a second turns ratio without disturbing the mounting of the input shaft during the disconnecting of the first range member and the receiving and connecting of the second range member.

2. The apparatus of claim 1 wherein the range means further comprises:
    (a) pinion means on the input shaft;
    (b) a support member mounted to the auxiliary support means; and
    (c) a compound shaft rotatably mounted to the support member and geared to the pinion means and to the sleeve means.

3. The apparatus of claim 2 wherein the range means further comprises change gear means for connecting the compound shaft to the sleeve means, the change gear means being mounted so that removal and replacement thereof does not require the mounting of either one of the compound shaft or the input shaft to be disturbed.

4. The apparatus of claim 1 wherein the calibration gear means includes a drive gear, the drive gear being rotationally fixed to the sleeve means, and an output gear rotationally fixed to the output shaft, the apparatus further comprising means for replacing the drive gear and the output gear without disturbing the mounting of either the input shaft or the output shaft during the replacement of the drive wear and the output gear.

5. The apparatus of claim 1 wherein the range means further comprises coupling means for directly connecting the sleeve means to the input shaft and releasing the sleeve means from the input shaft, without disturbing the mounting of the input shaft during the connecting and releasing of the coupling means.

6. The apparatus of claim 1 wherein range means comprises pinion means fixed to the input shaft, and the auxiliary support means comprises:
   (a) a journal in the housing for rotatably receiving a first end of the compound shaft; and
   (b) a supportive surface fixed within the housing and having engaged means for engaging at least one fastener for mounting a support member for the compound shaft.

7. The apparatus of claim 6 wherein the range means further comprises:
   (a) a support member mounted to the supportive surface and fixed thereto by a fastener, the fastener engaging the engaging means; and
   (b) a compound shaft rotatably mounted to the support member and geared to the pinion means and to the sleeve means, a first end of the compound shaft rotatably engaging the journal.

8. Apparatus for generating pulses corresponding to the rotation of a rotating member, the apparatus comprising:
   (a) a housing, the housing being adapted for mounting proximate the rotating member;
   (b) an input shaft rotatably mounted and enclosed within the housing and having a first magnetic member thereon for coupling the input shaft to the rotating member;
   (c) pinion means fixed to the input shaft;
   (d) auxiliary support means for rotatably mounting a compound shaft and gearing the compound shaft to the pinion, without disturbing the mounting of the input shaft and without requiring the first magnetic member to be decoupled from the rotating member during the mounting and gearing of the compound shaft to the pinion;
   (e) an output shaft;
   (f) means for repetitively interrupting an electrical current in response to rotation of the output shaft;
   (g) sleeve means on the input shaft;
   (h) calibration gear means for coupling the output shaft to the sleeve means at a calibration ratio;
   (i) means for receiving and connecting coupling means whereby the sleeve means is prevented from rotating relative to the input shaft, the calibration ratio defining a first overall gear ratio between the input shaft and the output shaft, without disturbing the mounting of the input shaft and without requiring the first magnetic member to be decoupled from the rotating member during the receiving and connecting of the coupling means; and
   (j) means for receiving and connecting change gear means for gearing the sleeve means to the compound shaft, whereby a second overall gear ratio between the input shaft and the output shaft is defined by the product of a compound ratio from the input shaft to the sleeve means through the compound shaft, and the calibration ratio, without disturbing the mounting of the input shaft and without requiring the first magnetic member to be decoupled from the rotating member during the receiving and connecting of the change gear means.

9. The apparatus of claim 8 further comprising a support member removably mounted to the auxiliary support means and having a compound shaft rotatably mounted thereto, the compound shaft being geared to the pinion means of the input shaft, and wherein the sleeve means is geared to the compound shaft.

10. The apparatus of claim 8 wherein the calibration gear forming the sleeve means and means includes a drive gear, the drive gear being rotationally fixed to the input shaft.

11. The apparatus of claim 8 wherein the means for producing electrical pulses comprising:
   (a) an output magnetic member fixed to the output shaft; and
   (b) a magnetically operated switch device coupled to the output magnetic member.

12. The apparatus of claim 8 further comprising:
   (a) an indicator magnetic member rotatably coupled to the input shaft;
   (b) an indicator cavity in the housing, the indicator cavity being visible external to the housing; and
   (c) an indicator device movable in the indicator cavity, the indicator device being magnetically coupled to the indicator magnetic member for displaying rotational movement of the input shaft.

13. The apparatus of claim 12 wherein the indicator device comprises a spherical member rollable about the periphery of the cavity.

14. The apparatus of claim 8 wherein the housing comprises a lid member for providing access to the auxiliary support means, the sleeve means and the calibration gear means, the lid member being sealingly connected to a main portion of the housing and removable while the input shaft remains operationally coupled to the rotating member and the interrupting means remains operationally connected to the input shaft, without disturbing the mounting of either the input shaft or the output shaft during removal of the lid member.

15. The method for changing a range scale factor of an apparatus for generating pulses corresponding to the rotation of a rotating member, the apparatus comprising a rotatably mounted input shaft, means on the input shaft for coupling the input shaft to the rotating member, an output shaft, means for repetitively interrupting an electrical current in response to rotation of the output shaft, sleeve means on and concentric with the input shaft, calibration gear means for rotating the output shaft in response to rotation of the sleeve means, and range means for rotating the sleeve means at a first turns ratio with respect to the input shaft, the method comprising the steps of:
   (a) releasing the range means without disturbing the mounting of the input shaft; and
   (b) gearing the sleeve means at a second turns ratio with respect to the input shaft without disturbing the mounting of the input shaft.

16. The method of claim 15 further comprising the step of clamping the sleeve to the input shaft.

17. The method of claim 15 further comprising the steps of:
   (a) providing a compound shaft, the compound shaft having a driven gear fixed thereto;
   (b) rotatably supporting, without disturbing the mounting of the input shaft, the compound shaft in the housing with the driven gear in geared engagement with the input shaft;
   (c) fixing a first change gear to the compound shaft; and (d) engaging a second change gear with the sleeve, the second change gear being in mesh with the first change gear.

18. Apparatus for generating pulses corresponding to the rotation of a rotating member, the apparatus comprising:
   (a) a rotatably mounted input shaft;
   (b) means on the input shaft for coupling the input shaft to the rotating member;
   (c) means for repetitively interrupting an electrical current in response to rotation of the input shaft;
   (d) housing means for excluding moisture from the input shaft and the interrupting means;
   (e) a magnetic member rotatably mounted in the housing;
   (f) means for rotating the magnetic member in response to rotation of the input shaft;
   (g) a cavity in the housing means external to the input shaft, the interrupting means, and magnetic member, the cavity having a circular periphery aligned concentrically with the magnetic member;
   (h) a spherical member rollable about the periphery of the cavity and magnetically coupled to the magnetic member; and
   (i) window means for retaining the indicating means in the cavity,
   whereby the spherical member rolls about the periphery of the cavity in response to rotation of the input shaft.

19. The apparatus of claim 18 wherein the magnetic member is fixed to the input shaft.

* * * * *